United States Patent
Fan et al.

(10) Patent No.: US 9,864,811 B2
(45) Date of Patent: Jan. 9, 2018

(54) TERMINAL DEVICE, SYSTEM FOR PROVIDING PICTURE AND METHOD FOR TRANSMITTING PICTURE

(71) Applicant: BEIJING QIHOO TECHNOLOGY COMPANY LIMITED, Beijing (CN)

(72) Inventors: Guofeng Fan, Beijing (CN); Jiongxuan Zhang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 157 days.

(21) Appl. No.: 14/438,035

(22) PCT Filed: Aug. 19, 2013

(86) PCT No.: PCT/CN2013/081741
§ 371 (c)(1),
(2) Date: Apr. 23, 2015

(87) PCT Pub. No.: WO2014/063519
PCT Pub. Date: May 1, 2014

(65) Prior Publication Data
US 2015/0294022 A1    Oct. 15, 2015

(30) Foreign Application Priority Data
Oct. 26, 2012    (CN) .......................... 2012 1 0417306

(51) Int. Cl.
*G06F 17/30*    (2006.01)
*H04W 4/18*    (2009.01)
(Continued)

(52) U.S. Cl.
CPC .. *G06F 17/30887* (2013.01); *G06F 17/30268* (2013.01); *H04L 67/02* (2013.01);
(Continued)

(58) Field of Classification Search
None
See application file for complete search history.

(56) References Cited

U.S. PATENT DOCUMENTS 8,804,754 B1 * 8/2014 Bai ................. H04L 47/2416
370/252
9,467,495 B2 * 10/2016 Memon ................ H04L 67/02
(Continued)

OTHER PUBLICATIONS

Fan Guofeng et al., English abstract only of Chinese application No. CN102970331A, Image providing system, publication date Mar. 13, 2013, one page.
(Continued)

*Primary Examiner* — Ninos Donabed
(74) *Attorney, Agent, or Firm* — Polsinelli PC

(57) ABSTRACT

The present disclosure discloses a terminal device, a system for providing picture and a method for transmitting picture and pertains to the field of network communications technologies. The method comprises: obtaining a URL of a picture to be transmitted according to a picture request initiated by a terminal device; determining the picture quality value of the picture to be transmitted according to the state of the network where the terminal device is located; determining the maximum resolution value of the picture to be transmitted according to the state of the network where the terminal device is located and the resolution value supported by the terminal device; sending the URL of the picture to be transmitted, the picture quality value of the picture to be transmitted and the maximum resolution value of the picture to be transmitted to a picture bed server; receiving the returned picture which had been processed by the picture bed server according to these parameters, and displaying it on the terminal device. Under the premise of not affecting the experience of viewing a picture by a user, the technical solution of the present disclosure realizes the
(Continued)

beneficial effects of reducing the transmission size of the picture, increasing the transmission speed of the picture, and at the same time guaranteeing the picture quality as much as possible.

9 Claims, 4 Drawing Sheets

(51) Int. Cl.
  *H04L 29/08* (2006.01)
  *H04L 29/06* (2006.01)
  *H04W 4/02* (2009.01)
(52) U.S. Cl.
  CPC .......... *H04L 67/10* (2013.01); *H04L 67/2861* (2013.01); *H04L 67/42* (2013.01); *H04W 4/02* (2013.01); *H04W 4/18* (2013.01)

(56) References Cited

U.S. PATENT DOCUMENTS

| | | | | |
|---|---|---|---|---|
| 2002/0163911 A1* | 11/2002 | Wee | ............ | H04L 41/0681 370/389 |
| 2002/0164018 A1* | 11/2002 | Wee | ............ | H04N 7/1675 380/37 |
| 2003/0018664 A1* | 1/2003 | Wee | ............ | H04L 9/00 715/201 |
| 2003/0067877 A1* | 4/2003 | Sivakumar | ............ | H04L 47/2416 370/232 |
| 2003/0068041 A1* | 4/2003 | Wee | ............ | H04N 7/167 380/200 |
| 2003/0069963 A1* | 4/2003 | Jayant | ............ | H04L 29/06027 709/224 |
| 2004/0022222 A1* | 2/2004 | Clisham | ............ | H04L 69/18 370/338 |
| 2005/0152397 A1* | 7/2005 | Bai | ............ | H04L 1/1887 370/468 |
| 2006/0242237 A1* | 10/2006 | Manion | ............ | G06Q 10/107 709/204 |
| 2006/0242639 A1* | 10/2006 | Manion | ............ | G06Q 10/10 717/169 |
| 2007/0036354 A1* | 2/2007 | Wee | ............ | H04N 7/167 380/37 |
| 2007/0090996 A1* | 4/2007 | Wang | ............ | H04L 67/12 342/463 |
| 2008/0144724 A1* | 6/2008 | Luo | ............ | H03M 13/353 375/240.26 |
| 2008/0261665 A1* | 10/2008 | Kwon | ............ | H04M 1/0237 455/575.4 |
| 2009/0098912 A1* | 4/2009 | Kim | ............ | G06F 3/0481 455/566 |
| 2009/0287841 A1* | 11/2009 | Chapweske | ............ | H04L 65/4084 709/231 |
| 2009/0300147 A1* | 12/2009 | Beers | ............ | H04L 12/1827 709/220 |
| 2010/0020823 A1* | 1/2010 | Bai | ............ | H04L 47/2416 370/468 |
| 2011/0066673 A1* | 3/2011 | Outlaw | ............ | H04L 65/4092 709/203 |
| 2012/0131601 A1* | 5/2012 | McDysan | ............ | H04N 21/23805 725/1 |
| 2012/0170645 A1* | 7/2012 | Chien | ............ | H04N 19/46 375/240.02 |
| 2012/0265847 A1 | 10/2012 | Swenson et al. | | |
| 2013/0179589 A1* | 7/2013 | McCarthy | ............ | H04N 21/8456 709/231 |

OTHER PUBLICATIONS

Zhidong Yan et al., English abstract only of Chinese application No. CN102469149A, Method and device for carrying out self-adaptive adjustment on images by agent, publication date May 23, 2012, one page.

Youfei Lu et al., English abstract only of Chinese application CN101770477A, Method and device for content adaptation of instance document in user terminal, publication date Jul. 7, 2010, one page.

International Search Report regarding PCT/CN2013/081741, dated Nov. 21, 2013, 3 pages.

* cited by examiner

TERMINAL DEVICE, SYSTEM FOR PROVIDING PICTURE AND METHOD FOR TRANSMITTING PICTURE

FIELD OF THE INVENTION

The invention relates to the field of network communications technologies, and in particular, to a terminal device, a system for providing a picture and a method for transmitting a picture.

BACKGROUND OF THE INVENTION

With the continuous progress of science and technology, the bandwidth of the Internet increases gradually, and more and more people view massive online pictures via a terminal device such as a mobile phone, a tablet computer, etc. Since the data amount of a picture is usually much larger than that of a plain text, when viewing massive pictures, a lot of traffic will also be consumed, and at the same time, the transmission time will also be long. While the consumption of traffic may be decreased by reducing the quality of a picture, this will have a certain impact on the experience of a user. Therefore, there is an urgent need for a method for finding a balance between the "picture quality" and the "transmission speed" without affecting the experience of a user.

The technical solution of a first prior art is that after getting a URL (Uniform/Universal Resource Locator) of an original picture, a client directly makes a request to a server, and the picture will not be transmitted until the request is successful.

The first prior art provides a simple and intuitive transmission method. However, its drawback is also obvious. If the size of an original picture is large, the amount of data to be transmitted is also large, but the first prior art simply sends the picture intactly to a client and the consumed traffic also becomes obviously large, and yet on some terminal devices with a small screen, such an original picture of high quality does not have an obvious improvement on the experience.

With respect to the drawback of the first prior art, a second prior art adds a picture bed server module. A client will select one from two or three kinds of different picture quality according to the current network condition, and then make a transmission request to the picture bed server. In response to the request, the picture bed server will transmit the picture data to the client and eventually present it to a user. Due to differentiation of the network condition, the final picture quality will be divided into two to three kinds: 2G network, 3G network, and Wi-Fi network. The 2G and 3G networks are provided by a mobile operator and will produce traffic fees in most cases, and therefore the traffic consumption and speed need to be considered. And yet the Wi-Fi network is provided by a nearby wireless router, there will not be traffic fees in most cases for it, and its speed is much faster than the former two, and therefore the traffic consumption and speed do not need to be considered. Thus, in the second prior art, a picture in a 2G/3G network will be processed into a picture of low quality for transmission, whereas the Wi-Fi network transmits a picture of high quality.

The second prior art realizes a method for selecting the quality of a picture that should be transmitted according to the network condition. In some scenarios (e.g., a 2G, 3G network, etc.) attaching great importance to traffic consumption, such a method plays the role of reducing traffic consumption and increasing the transmission speed. And yet the reduced picture quality is also acceptable on some devices.

However, due to the diversity of terminal devices, many different display sizes and display resolutions arise. For different resolutions, the display effects will also differ greatly, and the prior art cannot take into account these comprehensively. As an example, if a user is currently in a 2G network environment, the prior art will download a picture of low quality to reduce the traffic consumption and accelerate the transmission speed. If this picture is placed on a terminal device with the resolution of 320×240 and the size of 3.2 inches, the display effect will be good. However, if the same picture is placed on a terminal device with the resolution of 1280×800 and the size of 4.8 inches, since the terminal device is to ensure that a user can see a display pattern on a large-screen terminal device similar to that on a small-screen terminal device, in order to realize such an effect, the picture will be stretched, and the problems of blurring, excessive glitches, etc. that seriously affect the display effect will arise.

It is thus clear that although for the second prior art which determines the picture quality through the network environment, the problem with the transmission speed is solved to some extent, with respect to the display effect of a picture (the picture quality), there is a great difference between different terminal devices, and especially for a large-screen terminal device, the display effect thereby also becomes poor.

SUMMARY OF THE INVENTION

In view of the above problems, the present disclosure is proposed to provide a terminal device, a system for providing picture and a method for transmitting picture, which overcome the above problems or at least in part solve the above problems.

According to an aspect of the present disclosure, there is provided a terminal device, wherein the terminal device comprises a picture address obtaining unit, a network state detecting unit, a resolution detecting unit, an integrated processing unit and a transceiving unit;

the picture address obtaining unit is configured to obtain a uniform resource locator (URL) of a picture to be transmitted according to a picture request initiated by the terminal device, and send it to the integrated processing unit;

the network state detecting unit is configured to detect the state of the network where the terminal device is located and notify the integrated processing unit;

the resolution detecting unit is configured to detect the resolution value supported by the terminal device and notify the integrated processing unit;

the integrated processing unit is configured to determine the picture quality value of the picture to be transmitted according to the state of the network where the terminal device is located, determine the maximum resolution value of the picture to be transmitted according to the state of the network where the terminal device is located and the resolution value supported by the terminal device, and send the URL, the picture quality value and the maximum resolution value of the picture to be transmitted to the transceiving unit; and the transceiving unit is configured to send the URL, the picture quality value and the maximum resolution value of the picture to be transmitted to a picture bed server, and receive the returned picture which had been processed by the picture bed server according to the URL, the picture quality value and the maximum resolution value of the picture to be transmitted, and send it to a display screen of the terminal device for display.

According to another aspect of the present disclosure, there is provided a system for providing picture, wherein the system comprises a picture bed server and a terminal device as described above;

the picture bed server is configured to receive the URL of a picture to be transmitted, the picture quality value of the picture to be transmitted and the maximum resolution value of the picture to be transmitted sent by the terminal device, obtain the picture locally or from an original picture server according to the URL of the picture to be transmitted, process it according to the picture quality value of the picture to be transmitted and the maximum resolution value of the picture to be transmitted and then send the picture to the terminal device.

According to yet another aspect of the present disclosure, there is provided a method for transmitting picture, wherein the method comprises:

obtaining a uniform resource locator (URL) of a picture to be transmitted according to a picture request initiated by a terminal device;

detecting the state of the network where the terminal device is located;

determining the picture quality value of the picture to be transmitted according to the state of the network where the terminal device is located;

obtaining the resolution value supported by the terminal device;

determining the maximum resolution value of the picture to be transmitted according to the state of the network where the terminal device is located and the resolution value supported by the terminal device;

sending the URL, the picture quality value and the maximum resolution value of the picture to be transmitted to a picture bed server; and receiving the returned picture which had been processed by the picture bed server according to the URL, the picture quality value and the maximum resolution value of the picture to be transmitted, and displaying it on the terminal device.

According to the present disclosure, such a technical solution of obtaining a URL of a picture to be transmitted according to a picture request initiated by a terminal device, determining the picture quality value of the picture to be transmitted according to the state of the network where the terminal device is located, determining the maximum resolution value of the picture to be transmitted according to the state of the network where the terminal device is located and the resolution value supported by the terminal device, sending the URL of the picture to be transmitted, the picture quality value of the picture to be transmitted and the maximum resolution value of the picture to be transmitted to a picture bed server, receiving the returned picture which had been processed by the picture bed server according to these parameters, and displaying it on the terminal device, may determine the quality of a picture to be transmitted according to the network state and the resolution supported by the terminal device, thereby solves the balance problem of a picture between the "quality" and the "transmission time and traffic consumption", and obtains the beneficial effects of reducing the transmission size of the picture, increasing the transmission speed of the picture, and at the same time guaranteeing the picture quality as much as possible by adapting the network environment where the terminal device is located and the resolution information of the terminal device, without affecting the experience of viewing a picture by a user.

The above description is merely an overview of the technical solutions of the present disclosure. In the following particular embodiments of the present disclosure will be illustrated in order that the technical means of the present disclosure can be more clearly understood and thus may be embodied according to the content of the specification, and that the foregoing and other objects, features and advantages of the present disclosure can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the present disclosure. And throughout the drawings, like reference signs are used to denote like components. In the drawings.

DETAILED DESCRIPTION OF THE INVENTION

Figure 1:
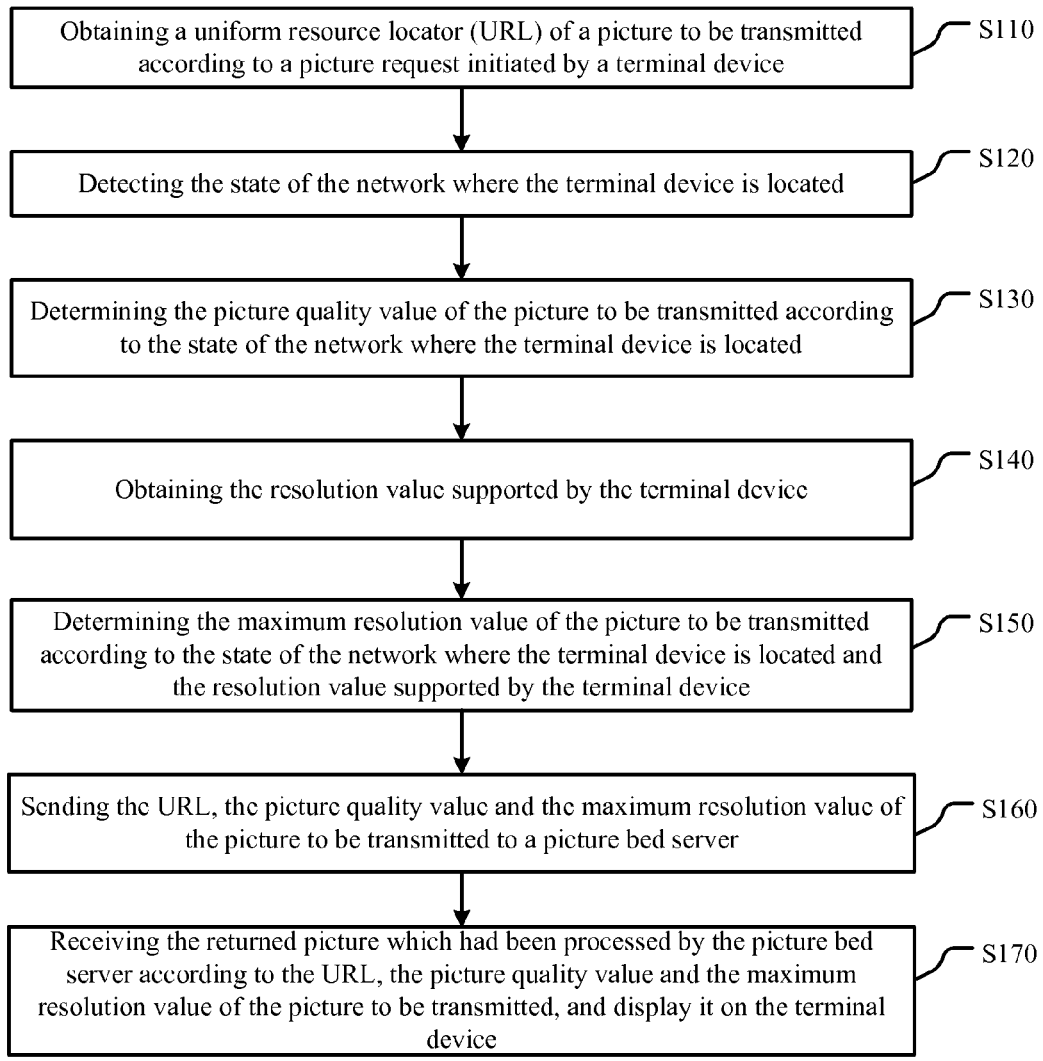
FIG. 1 shows a flow chart of a picture transmission method according to an embodiment of the present disclosure.

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

FIG. 1 shows a flow chart of a picture transmission method according to an embodiment of the present disclosure. As shown in FIG. 1, the method comprises the following steps.

At step S110, obtaining a uniform resource locator URL of a picture to be transmitted according to a picture request initiated by a terminal device.

In the present disclosure and being not limited to this embodiment, the picture to be transmitted is a picture stored in a picture bed server, and then the URL of the picture to be transmitted is a URL of a local storage location of the picture to be transmitted in the picture bed server, or the picture to be transmitted may also be a picture stored in an original picture server, and then the URL of the picture to be transmitted is a URL of a storage location of the picture to be transmitted in the original picture server.

If the URL is a URL of the picture to be transmitted on a picture bed server, it means that a client obtains a URL of an original picture needing to be downloaded on the picture bed server, namely, a URL of an original picture present on the picture bed server. This address does not come from other places, but from the picture bed server, nevertheless, it is completely identical to the original picture in terms of the content and information, which is similar to that the picture is copied intact to the picture bed server, and then the URL is replaced with a URL of a picture bed which may support a parameter. A client refers to a network picture viewing program installed on the terminal device.

At step S120, detecting the state of the network where the terminal device is located.

In the present disclosure and being not limited to this embodiment, a network state detecting unit of the terminal device will obtain the "network state", and the identification is used for judging whether a network exists or not and which network it is in. If a network is not connected to, the "network state" is marked as "no network", and the picture transmission process terminates. If the network is a 2G or 3G network, the "network state" is marked as "2G/3G"; and if the network is a Wi-Fi network, the "network state" is marked as "Wi-Fi". Afterwards, the "network state" is stored as a variable for later use.

At step 130, determining the picture quality value of the picture to be transmitted according to the state of the network where the terminal device is located.

In the present disclosure and being not limited to this embodiment, a client determines the quality value of a picture according to the "network state" variable. In an embodiment of the present disclosure, the quality value of a picture is in an interval of 0%-100%. The higher the value, the clearer the display effect of the picture, but the amount of transmission data of the picture also increases, and correspondingly, the transmission time will also increase. On the contrary, the lower the value, the more blurring the display effect of the picture, but the amount of transmission of the picture will become small, and correspondingly, the transmission time will also decrease. For example, if the current network state is "2G/3G", the quality value of the picture is specified to be 60% to implement the compression of the picture; and if the current network state is "Wi-Fi", the quality value of the picture is specified to be 80% to improve the display quality of the picture. Then, the quality value of the picture is saved as a variable for later use.

It is thus clear that at this step, the higher the transmission capability of the network where the terminal device is located, the higher the picture quality of the picture to be transmitted is set.

In the present disclosure and being not limited to this embodiment, a corresponding table may be preset, which table will be called a first list here, and in the first list is set a corresponding relationship between the network states of the terminal and the picture quality values. Then, the first list may be queried according to the network state in which the terminal device currently is, so as to determine the picture quality value of the picture to be transmitted.

An example of the first list is as shown in table 1:

TABLE 1

| State of the network where the terminal device is located | Picture quality value |
| --- | --- |
| 2G/3G | 60% |
| Wi-Fi | 80% |

Of course, in other embodiments of the present disclosure, the network state may be further divided in detail. For example, the transmission rate of a different WiFi network may also be different, and at this point, a different picture quality value may be set for a WiFi network with a different rate. The table 1 is just illustrative, and can not be construed as limiting.

At step S140, obtaining the resolution value supported by the terminal device.

Here, the resolution value supported by the terminal device may not only refer to both the pixel value of the width of the resolution supported by the terminal device and the pixel value of the height of the resolution of the terminal device, but also only refer to the pixel value of the width of the resolution supported by the terminal device or the pixel value of the height of the resolution of the terminal device.

Figure 2:
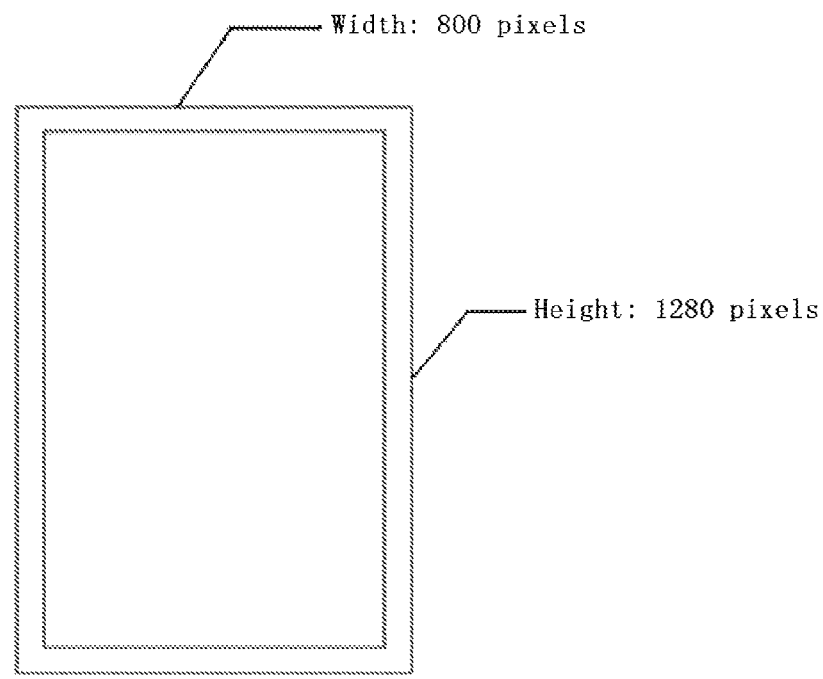
FIG. 2 shows a schematic diagram of a display screen of a terminal device according to an embodiment of the present disclosure.

In the present disclosure and being not limited to this embodiment, a resolution detecting unit of the terminal device obtains the width of the resolution of the current terminal device. It needs to pointed out here that the "width" referred to here is the pixel value of the upper (or lower) side of the current terminal device in the current screen direction, that is, when one and the same terminal device is in landscape or portrait, the "pixel value of the width" that the two refer to will be different. For example, on a terminal device with the resolution of 1280×800 (when in landscape placement, the width is 1280 pixels, and the height is 800 pixels), if the terminal device is in landscape placement, its width shall be 1280 pixels, and if the terminal device is in portrait placement, its width is more narrow and shall be 800 pixels. FIG. 2 shows a schematic diagram of a display screen of a terminal device according to an embodiment of the present disclosure, and in the figure, the width of the resolution of the terminal device is 800 pixels, and the height is 1280 pixels.

At step S150, determining the maximum resolution value of the picture to be transmitted according to the state of the network where the terminal device is located and the resolution value supported by the terminal device.

Here, the maximum resolution value of the picture to be transmitted comprises: the pixel value of the maximum picture width and/or the pixel value of the maximum picture height.

In the present disclosure and being not limited to this embodiment, the pixel value of the maximum picture width of the picture to be transmitted is determined according to the state of the network where the terminal device is located and the pixel value of the width of the resolution supported by the terminal device; and/or, the pixel value of the maximum picture height of the picture to be transmitted is determined according to the state of the network where the terminal device is located and the pixel value of the height of the resolution supported by the terminal device.

It needs to be noted that, the terminal device might support multiple resolution values for display, and then the resolution value supported by the terminal device herein refers to a default resolution value of the terminal device.

After obtaining the pixel value of the width of the resolution supported by the terminal device, the client gets the pixel value of the maximum picture width of the picture which shall be requested eventually according to the interval of the pixel value of the width in combination with the previously saved "network state".

In the present disclosure and being not limited to this embodiment, a corresponding table may be preset, which table will be called a second list here, and in the second list is set a corresponding relationship between the states of the network where the terminal device is located and the resolution values supported by the terminal device and the maximum resolution values of pictures to be transmitted. Then, the second list may be queried according to the network state in which the terminal device is and the resolution value supported by the terminal device, so as to determine the maximum resolution value of the picture to be transmitted.

In an embodiment of the present disclosure, an example of the second list is as shown in table 2:

TABLE 2

| Resolution value supported by the terminal device (pixel value of the width of the resolution) | State of the network where the terminal device is located | Maximum resolution value of the picture (pixel value of the maximum picture width) |
| --- | --- | --- |
| 480 | 2G/3G | 240 |
| 480 | Wi-Fi | 320 |
| 480~540 | 2G/3G | 320 |
| 480~540 | Wi-Fi | 480 |
| 540 | 2G/3G | 320 |
| 540 | Wi-Fi | 540 |
| >540 | 2G/3G | 540 |
| >540 | Wi-Fi | 800 |

Table 2 is a possible form of the second list, which is just illustrative here and cannot be construed as a definition of the second list.

Last, the "pixel value of the maximum picture width" is taken as the maximum resolution value of the picture to be transmitted and saved as a variable for later use.

In the present disclosure and being not limited to this embodiment, it may further be that for the case of a "too long picture", the client also limits the pixel value of the maximum height of a picture, and the specifics are similar to the processing of the "pixel value of the maximum picture width" described above, or also it may be defined as a constant, e.g., 1280 pixels.

It is thus clear that, the higher the transmission capability of the network where the terminal device is located and the resolution value supported by the terminal device, the higher the maximum resolution value of the picture to be transmitted is set.

At step S160, sending the URL, the picture quality value and the maximum resolution value of the picture to be transmitted to a picture bed server.

In the present disclosure and being not limited to this embodiment, the URL of the picture to be transmitted, the picture quality value of the picture to be transmitted and the maximum resolution value of the picture to be transmitted are spliced in a specified way into a URL by which the picture bed server processes a picture and sent to the picture bed server for request. Here, it is further necessary to send the splicing way of splicing the URL by which the picture bed server processes a picture to the picture bed server, such that the picture bed server can parse the received URL.

For example, they may be spliced into http://xx/dr/800_1280_60/, wherein xx is the "URL of the picture", 800 is the "pixel value of the maximum picture width", 1280 is the "pixel value of the maximum picture height", and 60 is the "quality value of the picture".

Therein, "URL template" represents a URL available for customization, for example, "/dr/width_height_quality value" is a "URL template", and its derivative part is a URL which can be really used, e.g., "/dr/800_1280_60".

At step S170, receiving the returned picture which had been processed by the picture bed server according to the URL, the picture quality value and the maximum resolution value of the picture to be transmitted, and displaying it on the terminal device.

In the present disclosure and being not limited to this embodiment, if the URL of the picture to be transmitted is a URL of the picture to be transmitted in the picture bed server, then the picture bed server obtains the picture to be transmitted locally according to the URL of the picture to be transmitted in the picture bed server, and returns the picture to the terminal device after processing it according to the picture quality value of the picture to be transmitted and the maximum resolution value of the picture to be transmitted.

If the URL of the picture to be transmitted is a URL of the picture to be transmitted in the original picture server, then the picture bed server obtains the picture to be transmitted from the original picture server according to the URL of the picture to be transmitted in the original picture server, and returns the picture to the terminal device after processing it according to the picture quality value of the picture to be transmitted and the maximum resolution value of the picture to be transmitted.

For example, after receiving a request from a client on the terminal device, the picture bed server will obtain the picture according to the URL of the picture to be transmitted, then according to the demand of the client, scale the picture isometrically to the maximum pixel value as required by the client and lower the picture quality. If the size of an original picture is 1920×1080 (the width is 1920 pixels, and the height is 1080 pixels), the quality of the picture is good, at this point, the quality of the picture is 100%, the size of the machine of the client is 800×600, and it is in portrait orientation and in a 3G network environment, then employing the principles as shown in tables 1 and 2 is taken as an example.

Referring to table 1, since the network is a 3G network, the picture quality value is 60%. Referring to table 2, since the network is a 3G network and the value of the width of the resolution supported by the terminal device is 600 pixels, the pixel value of the maximum width is 540 pixels. In addition, to avoid the case of a too long picture, the pixel value of the maximum height of a picture is set to be 1280 pixels. Then, the picture after a processing module of the picture bed server has processed it should meet: the picture quality value is 60%, and the size of the picture is 540×308 (which meets that the maximum width is 540 pixels, and meanwhile the height is scaled isometrically by a factor of 3.55). Then, the terminal device will wait for the result from the picture bed server, which may be "OK", "Failure", or "No return". If the result is the last two, then a retry is made or the download process is made to terminate. If the result is "OK", then the client starts to download the processed picture from the picture bed server. Finally, after the processed picture has been downloaded, a user may see a picture adapted to the device and the network environment on the terminal device, and the whole download process ends.

The conclusion is that, the size of the picture is only 110 Kbytes, which is decreased by a factor of 55.6 relative to the size of the original picture, and for which the time for download will be saved by a factor of 55.6 as compared to the original picture in the case of the transmission speed being unchanged. However, in the processing employing the second prior art, under the premise that the above "original picture" (its maximum width, maximum height, quality, and content) keeps unchanged, the "picture quality value" is adjusted only through the network environment, and the size of the picture is still 465 Kbytes, and there is still some gap between it and 110 Kbytes of the present disclosure.

It is clear that the above technical solution effectively solves the balance problem of a picture between the "quality" and the "transmission time", such that without affecting the experience of viewing a picture by a user, it reduces the transmission size of the picture, increases the transmission speed of the picture, and at the same time guarantees the picture quality as much as possible by adapting the network environment where the device is located and the resolution information, and gives the user a more perfect experience.

Figure 3:
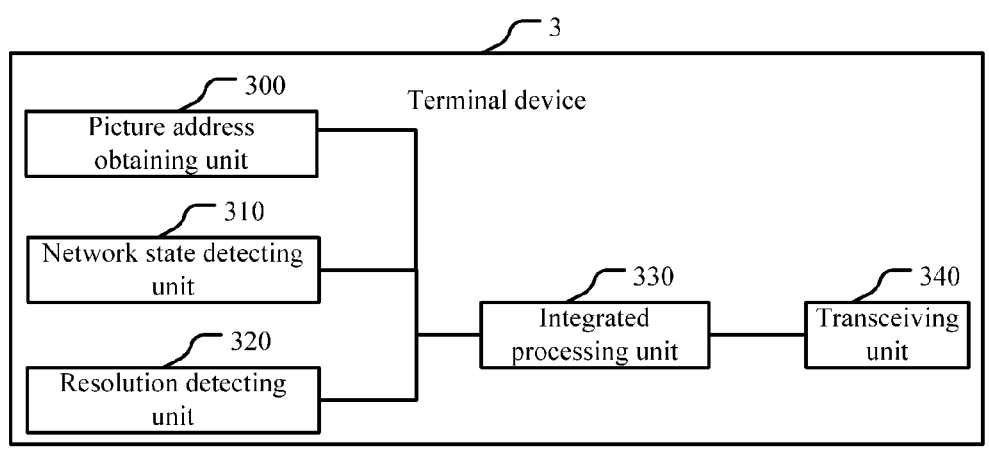
FIG. 3 shows a structural diagram of a terminal device according to an embodiment of the present disclosure.

FIG. 3 shows a structural diagram of a terminal device according to an embodiment of the present disclosure. As shown in FIG. 3, the terminal device 3 comprises: a picture address obtaining unit 300, a network state detecting unit 310, a resolution detecting unit 320, an integrated processing unit 330 and a transceiving unit 340;

the picture address obtaining unit 300 is configured to obtain a uniform resource locator URL of a picture to be transmitted according to a picture request initiated by the terminal device 3, and send it to the integrated processing unit 330;

the network state detecting unit 310 is configured to detect the state of the network where the terminal device 3 is located and notify the integrated processing unit 330;

the resolution detecting unit 320 is configured to detect the resolution value supported by the terminal device 3 and notify the integrated processing unit 330;

the integrated processing unit 330 is configured to determine the picture quality value of the picture to be transmitted according to the state of the network where the terminal device 3 is located, determine the maximum resolution value of the picture to be transmitted according to the state of the network where the terminal device 3 is located and the resolution value supported by the terminal device 3, and send the URL of the picture to be transmitted, the picture quality value of the picture to be transmitted and the maximum resolution value of the picture to be transmitted to the transceiving unit 340; and the transceiving unit 340 is configured to send the URL of the picture to be transmitted, the picture quality value of the picture to be transmitted and the maximum resolution value of the picture to be transmitted to a picture bed server, and receive the returned picture which had been processed by the picture bed server according to the URL of the picture to be transmitted, the picture quality value of the picture to be transmitted and the maximum resolution value of the picture to be transmitted, and send it to a display screen of the terminal device for display.

Therein, the maximum resolution value of the picture to be transmitted comprises: the pixel value of the maximum picture width and/or the pixel value of the maximum picture height; and the integrated processing unit is configured to determine the pixel value of the maximum picture width of the picture to be transmitted according to the state of the network where the terminal device 3 is located and the pixel value of the width of the resolution supported by the terminal device 3; and/or, determine the pixel value of the maximum picture height of the picture to be transmitted according to the state of the network where the terminal device is located and the pixel value of the height of the resolution supported by the terminal device.

In the terminal device of the present disclosure, the integrated processing unit is configured to set the picture quality value of the picture to be transmitted to be higher, when the transmission capability of the network where the terminal device is located is higher.

For example, in an embodiment of the present disclosure, the quality value of a picture is in an interval of 0%-100%. The higher the value, the clearer the display effect of the picture. For example, if the current network state is "2G/3G", the quality value of the picture is specified to be 60% to implement the compression of the picture; and if the current network state is "Wi-Fi", the quality value of the picture is specified to be 80% to improve the display quality of the picture.

In the terminal device of the present disclosure, the integrated processing unit is configured to set the maximum resolution value of the picture to be transmitted to be higher when the transmission capability of the network where the terminal device is located and the resolution value of the terminal device are higher. For example, a second list as shown in table 2 may be set, and the maximum resolution value of a picture to be transmitted may be determined by querying the second list. Therein, in the second list, the higher the transmission capability of the network where the terminal device is located and the resolution value of the terminal device, the higher the maximum resolution value of the picture to be transmitted. However, the content of the second list is not limited what is shown in table 2.

When the picture to be transmitted is a picture stored in the picture bed server, the URL of the picture to be transmitted is a URL of a local storage location of the picture to be transmitted in the picture bed server. And in the terminal device of the present disclosure, the transceiving unit is configured to receive a picture returned by the picture bed server after the picture bed server has obtained the picture to be transmitted locally according to the URL of the picture to be transmitted and processed the obtained picture to be transmitted according to the picture quality value of the picture to be transmitted and the maximum resolution value of the picture to be transmitted, and then send the returned picture to the display screen of the terminal device for display.

Or, when the picture to be transmitted is a picture stored in the original picture server, the URL of the picture to be transmitted is a URL of a storage location of the picture to be transmitted in the original picture server. And in the terminal device of the present disclosure, the transceiving unit is configured to receive a picture returned by the picture bed server after the picture bed server has obtained the picture to be transmitted from the original picture server according to the URL of the picture to be transmitted and processed the obtained picture to be transmitted according to the picture quality value of the picture to be transmitted and the maximum resolution value of the picture to be transmitted, and then send the returned picture to the display screen of the terminal device for display.

In the terminal device of the present disclosure, the transceiving unit is configured to splice the URL of the picture to be transmitted in the picture bed server, the picture quality value of the picture to be transmitted and the maximum resolution value of the picture to be transmitted in a specified way into a URL by which the picture bed server processes a picture and send it to the picture bed server.

For example, they may be spliced into http://xx/dr/800_1280_60/, wherein xx is the "URL of the original picture in the picture bed server", 800 is the "pixel value of the maximum picture width", 1280 is the "pixel value of the maximum picture height", and 60 is the "quality value of the picture".

In the terminal device of the present disclosure, the transceiving unit is further configured to send the splicing way of splicing the URL by which the picture bed server processes a picture to the picture bed server, such that the picture bed server can parse the received URL.

Figure 4:
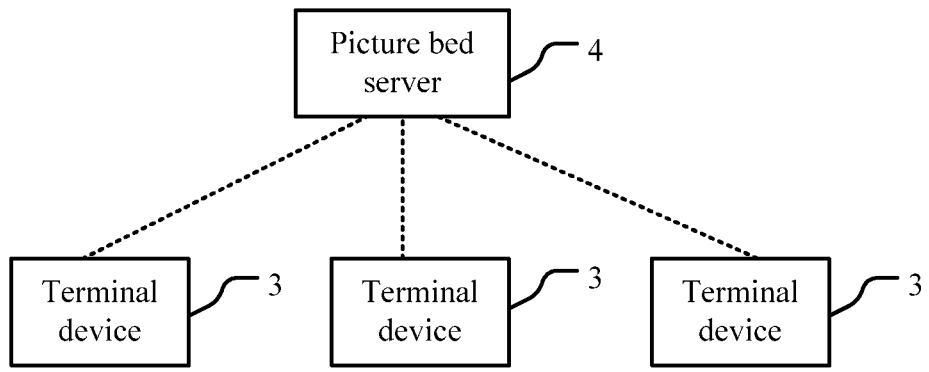
FIG. 4 shows a schematic diagram of a picture providing system according to an embodiment of the present disclosure.

FIG. 4 shows a schematic diagram of a picture providing system according to an embodiment of the present disclosure. As shown in FIG. 4, the picture providing system comprises multiple terminal devices 3 and a picture bed server 4.

A terminal device 3 in the system as shown in FIG. 4 is the terminal device 3 as shown in FIG. 3.

The picture bed server 4 is configured to receive the URL of a picture to be transmitted, the picture quality value of the picture to be transmitted and the maximum resolution value of the picture to be transmitted sent by a terminal device 3, obtain the picture locally or from an original picture server according to the URL of the picture to be transmitted, process it according to the picture quality value of the picture to be transmitted and the maximum resolution value of the picture to be transmitted and then send the picture to the terminal device 3.

In the picture providing system of the present disclosure, the terminal device is connected with the picture bed server via a wired network or a wireless network. One picture bed server may be connected with multiple terminal devices. In practice, one or more picture bed server may be configured according to the situation, and then a many-to-many relationship is formed between the picture bed servers and the terminal devices.

Figure 5:
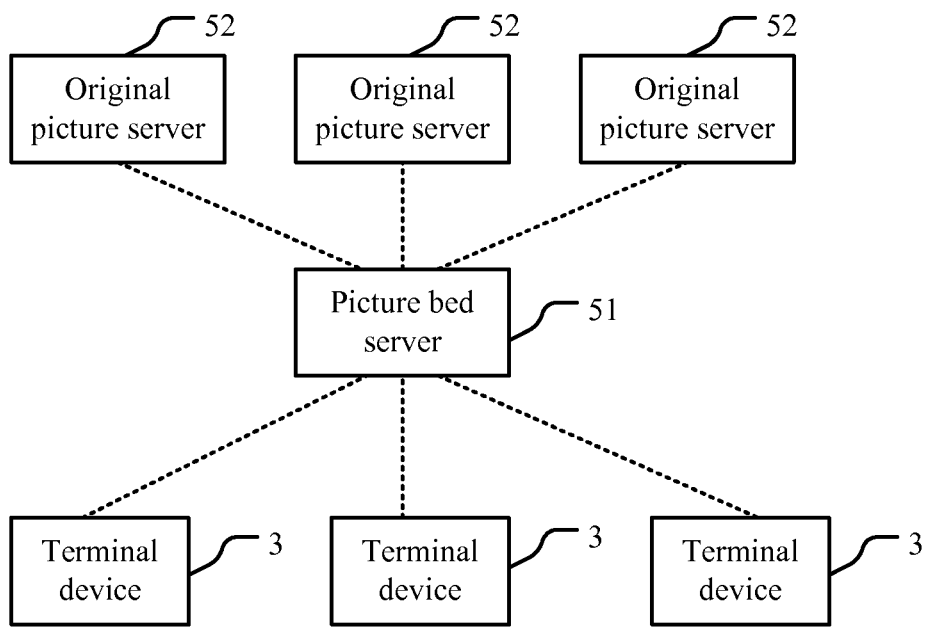
FIG. 5 shows a schematic diagram of another picture providing system according to an embodiment of the present disclosure.

If the URL of the picture to be transmitted is a URL of the picture to be transmitted in an original picture server, then the picture providing system in the present disclosure further comprises one or more original picture server, which is particularly as shown in FIG. 5.

FIG. 5 shows a schematic diagram of yet another picture providing system according to an embodiment of the present disclosure. As shown in FIG. 5, the picture providing system comprises: multiple terminal devices 3, a picture bed server 51 and multiple original picture servers 52.

A terminal device 3 in the system as shown in FIG. 5 is the terminal device 3 as shown in FIG. 3. The picture bed server 51 is configured to receive the URL of a picture to be transmitted, the picture quality value of the picture to be transmitted and the maximum resolution value of the picture to be transmitted sent by a terminal device 3, obtain the picture from an original picture server 52 according to the URL of the picture to be transmitted, processing it according to the picture quality value of the picture to be transmitted and the maximum resolution value of the picture to be transmitted and then send the picture to the terminal device 3. The terminal device 3 is connected with the picture bed server 51 via a wired network or a wireless network. The picture bed server 51 is connected with the original picture server 52 via a wired network or a wireless network. After receiving a request from a terminal device, the picture bed server 51 obtains a picture from an original picture server 52 according the URL of the picture to be transmitted in the original picture server 52, processes it correspondingly and then returns it to the terminal device 3.

In summary, such a technical solution of the present disclosure of obtaining a URL of a picture to be transmitted according to a picture request initiated by a terminal device, determining the picture quality value of the picture to be transmitted according to the state of the network where the terminal device is located, determining the maximum resolution value of the picture to be transmitted according to the state of the network where the terminal device is located and the resolution value supported by the terminal device, sending the URL of the picture to be transmitted, the picture quality value of the picture to be transmitted and the maximum resolution value of the picture to be transmitted to a picture bed server, receiving the picture returned after the picture bed server has processed it according to these parameters, and displaying it on the terminal device, may determine the quality of a picture to be transmitted according to the network state and the resolution of the terminal device, thereby solves the balance problem of a picture between the "quality" and the "transmission time and traffic consumption", and obtains the beneficial effects of reducing the transmission size of the picture, increasing the transmission speed of the picture, and at the same time guaranteeing the picture quality as much as possible by adapting the network environment where the terminal device is located and the resolution information of the terminal device, without affecting the experience of viewing a picture by a user.

It needs to be noted that in case of no confliction, embodiments in the present disclosure and features in embodiments may be combined with each other arbitrarily.

Embodiments of the individual components of the present disclosure may be implemented in hardware, or in a software module running on one or more processors, or in a combination thereof. It will be appreciated by those skilled in the art that, in practice, some or all of the functions of some or all of the components in a system for providing picture according to individual embodiments of the present disclosure may be realized using a microprocessor or a digital signal processor (DSP). The present disclosure may also be implemented as a device or apparatus program (e.g., a computer program and a computer program product) for carrying out a part or all of the method as described herein. Such a program implementing the present disclosure may be stored on a computer readable medium, or may be in the form of one or more signals. Such a signal may be obtained by downloading it from an Internet website, or provided on a carrier signal, or provided in any other form.

Figure 6:
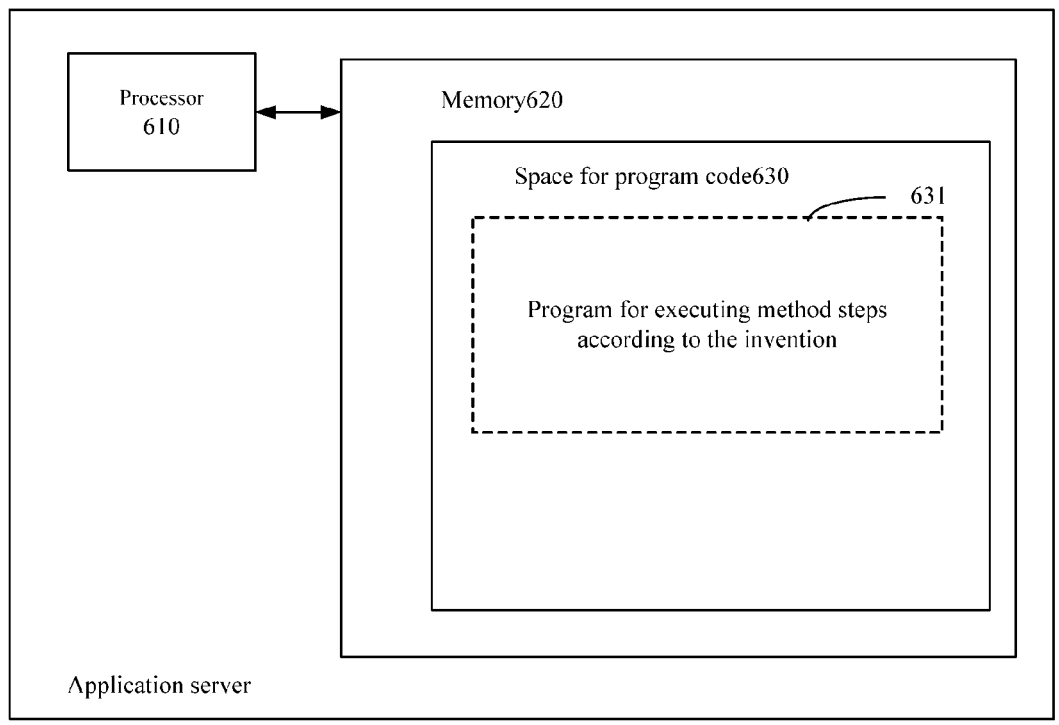
FIG. 6 shows schematically a block diagram of a server for performing a method according to the present disclosure.
Figure 7:
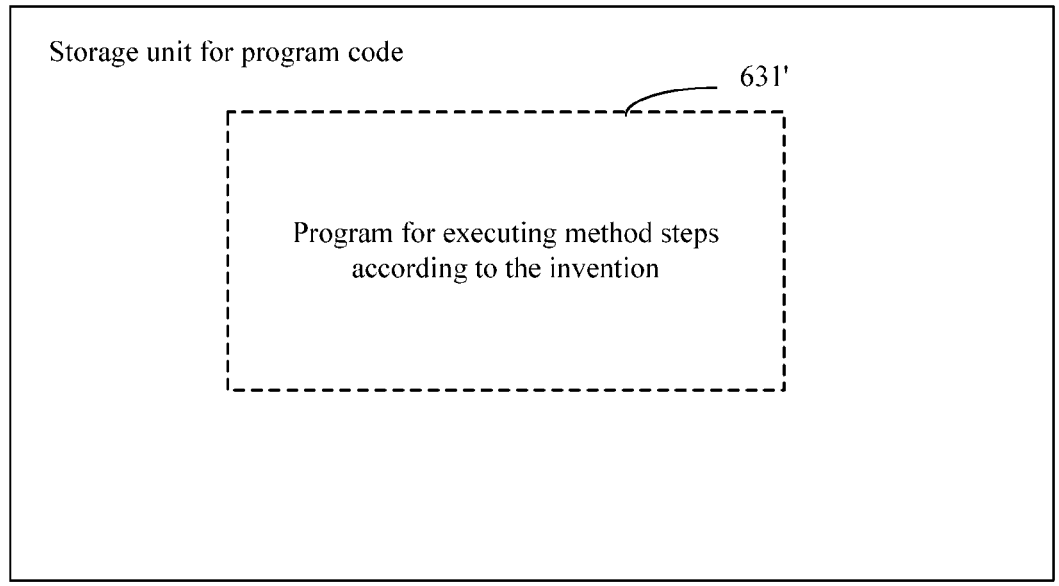
FIG. 7 shows schematically a storage unit for retaining or carrying a program code implementing a method according to the present disclosure.

For example, FIG. 6 shows a server which may carry out a method for transmitting picture according to the present disclosure, e.g., an application server. The server traditionally comprises a processor 610 and a computer program product or a computer readable medium in the form of a memory 620. The memory 620 may be an electronic memory such as a flash memory, an EEPROM (electrically erasable programmable read-only memory), an EPROM, a hard disk or a ROM. The memory 620 has a memory space 630 for a program code 631 for carrying out any method steps in the methods as described above. For example, the memory space 630 for a program code may comprise individual program codes 631 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 7. The storage unit may have a memory segment, a memory space, etc. arranged similarly to the memory 620 in the server of FIG. 6. The program code may for example be compressed in an appropriate form. In general, the storage unit comprises a computer readable code 631', i.e., a code which may be read by e.g., a processor such as 610, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the present disclosure. In addition, it is to be noted that, examples of a phrase "in an embodiment" herein do not necessarily all refer to one and the same embodiment.

In the specification provided herein, a plenty of particular details are described. However, it can be appreciated that an embodiment of the present disclosure may be practiced without these particular details. In some embodiments, well known methods, structures and technologies are not illustrated in detail so as not to obscure the understanding of the specification.

It is to be noted that the above embodiments illustrate rather than limit the present disclosure, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The present disclosure may be implemented by means of a hardware comprising several distinct elements and by means of a suitably programmed computer. In a unit claim enumerating several means, several of the means may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the present disclosure. Therefore, for those of ordinary skills in the art, many modifications and variations are apparent without departing the scope and spirit of the appended claims. For the scope of the present disclosure, the disclosure of the present disclosure is illustrative, but not limiting, and the scope of the present disclosure is defined by the appended claims.

The invention claimed is:

1. A terminal device comprising:
a memory having instructions stored thereon;
a processor to execute the instructions to perform operations for transmitting a picture, the operations comprising:
obtaining a uniform resource locator (URL) of a picture to be transmitted according to a picture request initiated by the terminal device, wherein the picture to be transmitted is (i) a picture stored in a picture bed server, and the URL of the picture to be transmitted is a URL of a storage location of the picture in the picture bed server or (ii) a picture stored in an original picture server, and the URL of the picture to be transmitted is a URL of a storage location of the picture in the original picture server;
detecting a state of a network where the terminal device is located;
detecting a resolution value supported by the terminal device;
determining a picture quality value of the picture to be transmitted according to the state of the network where the terminal device is located;
determining a maximum resolution value of the picture to be transmitted according to the state of the network where the terminal device is located and the resolution value supported by the terminal device;
sending the URL, the picture quality value, and the maximum resolution value of the picture to be transmitted to the picture bed server by generating a combined URL by splicing the URL, the picture quality value, and the maximum resolution value of the picture to be transmitted in a specified way and sending the combined URL to the picture bed server for processing;
sending the specified way for splicing to the picture bed server, such that the picture bed server can parse the received combined URL; and
receiving the returned picture which had been processed by the picture bed server according to the URL, the picture quality value, and the maximum resolution value of the picture to be transmitted, and displaying the returned picture on the terminal device.

2. The terminal device as claimed in claim 1, wherein the maximum resolution value of the picture to be transmitted comprises: a pixel value of a maximum picture width and/or a pixel value of a maximum picture height; and
the determining the maximum resolution value of the picture to be transmitted according to the state of the network where the terminal device is located and the resolution value supported by the terminal device comprises:
determining the pixel value of the maximum picture width according to the state of the network where the terminal device is located and the pixel value of the width of the resolution supported by the terminal device; and/or
determining the pixel value of the maximum picture height according to the state of the network where the terminal device is located and the pixel value of the height of the resolution value supported by the terminal device.

3. The terminal device as claimed in claim 1, wherein the determining the picture quality value of the picture to be transmitted according to the state of the network where the terminal device is located comprises:
setting the picture quality value of the picture to be transmitted to be higher, when transmission capability of the network where the terminal device is located is higher.

4. The terminal device as claimed in claim 1, wherein the determining the maximum resolution value of the picture to be transmitted according to the state of the network where the terminal device is located and the resolution value supported by the terminal device comprises:
setting the maximum resolution value of the picture to be transmitted to be higher when transmission capability of the network where the terminal device is located and the resolution value of the terminal device are higher.

5. A method for transmitting a picture comprising:
obtaining, by a processor, a uniform resource locator (URL) of a picture to be transmitted according to a picture request initiated by a terminal device, wherein the picture to be transmitted is (i) a picture stored in a picture bed server, and the URL of the picture to be transmitted is a URL of a storage location of the picture in the picture bed server or (ii) a picture stored in an original picture server, and the URL of the picture to be transmitted is a URL of a storage location of the picture in the original picture server;

detecting, by the processor, a state of a network where the terminal device is located;

determining, by the processor, a picture quality value of the picture to be transmitted according to the state of the network where the terminal device is located;

obtaining, by the processor, a resolution value supported by the terminal device;

determining, by the processor, a maximum resolution value of the picture to be transmitted according to the state of the network where the terminal device is located and the resolution value supported by the terminal device;

sending, by the processor, the URL, the picture quality value, and the maximum resolution value of the picture to be transmitted to the picture bed server by generating a combined URL by splicing the URL, the picture quality value, and the maximum resolution value of the picture to be transmitted in a specified way and sending the combined URL to the picture bed server for processing;

sending the specified way for splicing to the picture bed server, such that the picture bed server can parse the received combined URL; and receiving, by the processor, the returned picture which had been processed by the picture bed server according to the URL, the picture quality value, and the maximum resolution value of the picture to be transmitted, and displaying the returned picture on the terminal device.

6. The method as claimed in claim 5, wherein the maximum resolution value of the picture to be transmitted comprises: a pixel value of a maximum picture width and/or a pixel value of a maximum picture height; and the determining the maximum resolution value of the picture to be transmitted according to the state of the network where the terminal device is located and the resolution value supported by the terminal device comprises:

determining the pixel value of the maximum picture width according to the state of the network where the terminal device is located and the pixel value of the width of the resolution supported by the terminal device; and/or determining the pixel value of the maximum picture height according to the state of the network where the terminal device is located and the pixel value of the height of the resolution value supported by the terminal device.

7. The method as claimed in claim 5, wherein the determining the picture quality value of the picture to be transmitted according to the state of the network where the terminal device is located comprises: setting the picture quality value of the picture to be transmitted to be higher, when transmission capability of the network where the terminal device is located is higher.

8. The method as claimed in claim 5, wherein the determining the maximum resolution value of the picture to be transmitted according to the state of the network where the terminal device is located and the resolution value supported by the terminal device comprises: setting the maximum resolution value of the picture to be transmitted to be higher when transmission capability of the network where the terminal device is located and the resolution value supported by the terminal device are higher.

9. A non-transitory computer readable medium having instructions stored thereon that, when executed by at least one processor, cause the at least one processor to perform operations of transmitting a picture, comprising:

obtaining a uniform resource locator (URL) of a picture to be transmitted according to a picture request initiated by a terminal device, wherein the picture to be transmitted is (i) a picture stored in a picture bed server, and the URL of the picture to be transmitted is a URL of a storage location of the picture in the picture bed server or (ii) a picture stored in an original picture server, and the URL of the picture to be transmitted is a URL of a storage location of the picture in the original picture server;

detecting a state of a network where the terminal device is located;

determining a picture quality value of the picture to be transmitted according to the state of the network where the terminal device is located;

obtaining a resolution value supported by the terminal device;

determining a maximum resolution value of the picture to be transmitted according to the state of the network where the terminal device is located and the resolution value supported by the terminal device;

sending the URL, the picture quality value, and the maximum resolution value of the picture to be transmitted to picture bed server by generating a combined URL by splicing the URL, the picture quality value, and the maximum resolution value of the picture to be transmitted in a specified way and sending the combined URL to the picture bed server for processing;

sending the specified way for splicing to the picture bed server, such that the picture bed server can parse the received combined URL; and receiving the returned picture which had been processed by the picture bed server according to the URL, the picture quality value, and the maximum resolution value of the picture to be transmitted, and displaying the returned picture on the terminal device.

* * * * *